(12) United States Patent
Iwamura (10) Patent No.: US 8,654,736 B2
(45) Date of Patent: Feb. 18, 2014

(54) BASE STATION, USER APPARATUS, AND METHOD

(75) Inventor: Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 893 days.

(21) Appl. No.: 12/304,549

(22) PCT Filed: Jun. 15, 2007

(86) PCT No.: PCT/JP2007/062171
§ 371 (c)(1),
(2), (4) Date: Dec. 16, 2009

(87) PCT Pub. No.: WO2007/145340
PCT Pub. Date: Dec. 21, 2007

(65) Prior Publication Data
US 2010/0111036 A1    May 6, 2010

(30) Foreign Application Priority Data

Jun. 16, 2006 (JP) .................................. 2006-167998

(51) Int. Cl.
*H04W 4/00* (2009.01)
(52) U.S. Cl.
USPC .......................................................... 370/331
(58) Field of Classification Search
USPC .......................................................... 370/331
See application file for complete search history.

(56) References Cited

U.S. PATENT DOCUMENTS

| | | | |
|---|---|---|---|
| 7,979,072 B2 * | 7/2011 | Senarath et al. ............. | 455/442 |
| 2005/0207374 A1 * | 9/2005 | Petrovic et al. ............. | 370/331 |
| 2005/0259663 A1 * | 11/2005 | Ode et al. .................... | 370/395.4 |
| 2006/0040699 A1 * | 2/2006 | Kim et al. .................... | 455/524 |
| 2006/0286985 A1 * | 12/2006 | Pedersen ...................... | 455/445 |
| 2007/0079207 A1 * | 4/2007 | Seidel et al. ................. | 714/748 |
| 2007/0081498 A1 | 4/2007 | Niwano | |
| 2007/0153742 A1 * | 7/2007 | Sebire et al. ................. | 370/331 |

FOREIGN PATENT DOCUMENTS

| | | |
|---|---|---|
| EP | 1727382 A1 | 11/2006 |
| JP | 2004-040536 A | 2/2004 |
| JP | 2004-129070 A | 4/2004 |
| WO | 2004/075589 A1 | 9/2004 |
| WO | 2005/046282 A1 | 5/2005 |
| WO | 2005084066 A1 | 9/2005 |

OTHER PUBLICATIONS

Japanese Office Action for Application No. 2008-521282, mailed on Nov. 15, 2011 (5 pages).

(Continued)

*Primary Examiner* — Steven H Nguyen
*Assistant Examiner* — Saad A Waqas
(74) *Attorney, Agent, or Firm* — Osha Liang LLP (57) ABSTRACT

A base station comprises a transmission buffer configured to store a service data unit received from the access gateway; a retransmission buffer configured to store a packet data unit to be retransmitted in a radio downlink; a scheduler configured to determine assignment of radio resources to user apparatuses and supply scheduling information; and a transmitted signal processing unit configured to generate a transmitted signal including data stored in the transmission buffer or the retransmission buffer in accordance with the scheduling information. The scheduler is configured to determine the scheduling information to transmit data destined for a user apparatus requesting handover in priority to data destined for a user apparatus that does not request handover.

10 Claims, 7 Drawing Sheets

(56) References Cited

OTHER PUBLICATIONS

International Search Report w/translation from PCT/JP2007/062171 dated Jul. 24, 2007 (4 pages).
Written Opinion from PCT/JP2007/062171 dated Jul. 24, 2007 (3 pages).

3GPP TR25.813, V1.0.1; "Evolved Universal Terrestrial Radio Access (E-UTRA) and Evolved Universal Terrestrial Radio Access Network (E-UTRA)"; Jun. 2006 (39 pages).
3GPP TR25.813 V0.9.1; "Evolved Universal Terrestrial Radio Access (E-UTRA) and Evolved Universal Terrestrial Radio Access Network (E-UTRA)"; May 2006 (39 pages).

* cited by examiner

BASE STATION, USER APPARATUS, AND METHOD

TECHNICAL FIELD

The present invention generally relates to the technical field of mobile communication, and more particularly relates to base stations, user apparatuses and methods for use in communication systems including access gateways and radio access networks.

BACKGROUND ART

In this technical field, research and development on next generation mobile communication systems have been accelerated under 3GPP.

Figure 1:
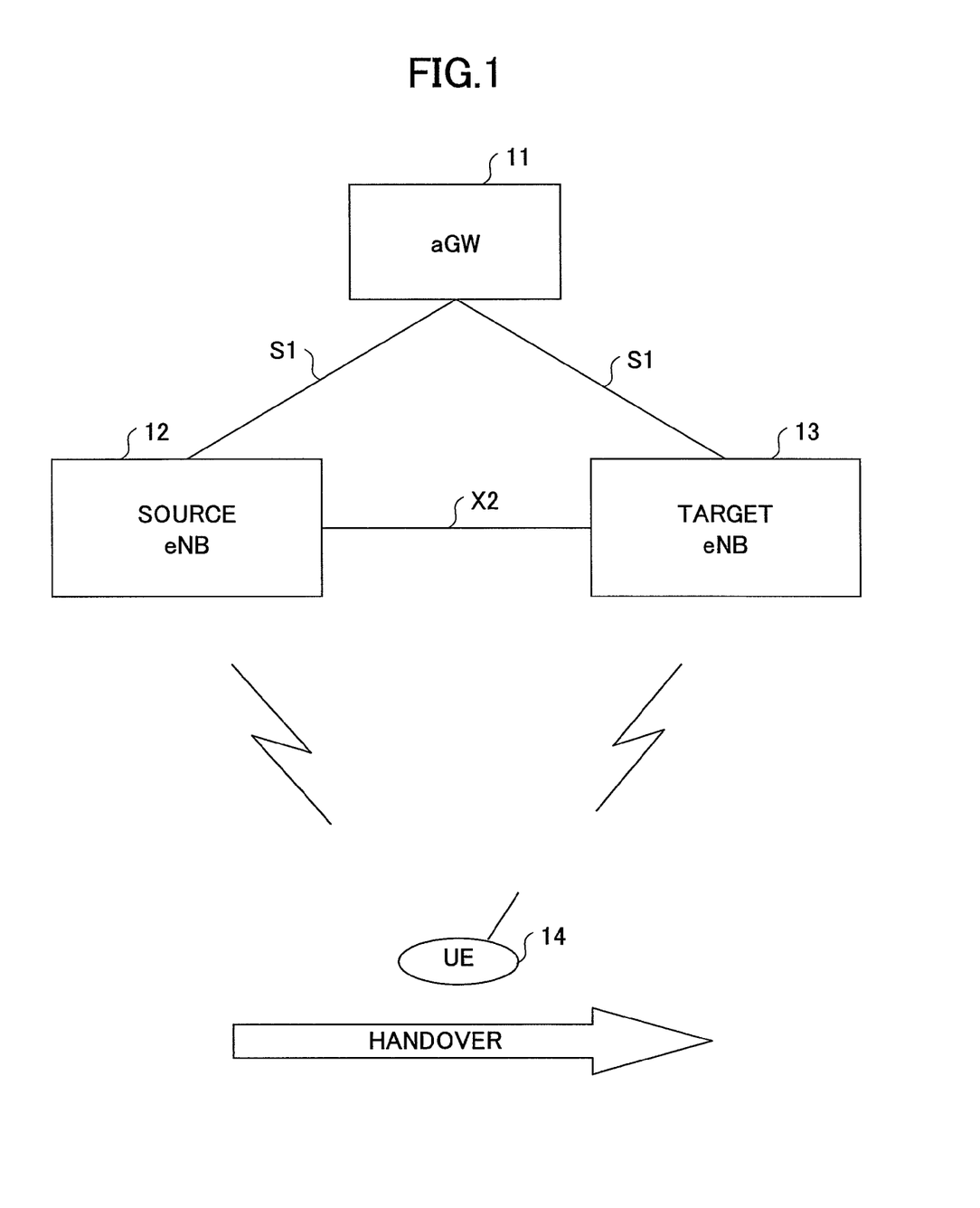
FIG. 1 schematically shows a communication system.

FIG. 1 schematically shows an exemplary communication system. In FIG. 1, an access gateway (aGW) 11, base stations (eNBs) 12, 13 connected to the access gateway 11 via interfaces S1, and a user apparatus (UE) 14 wirelessly communicating with the base station 12 or 13 are illustrated. The access gateway (aGW) 11 may be referred to as a mobile management entity/service gateway (MME/S-GW). Typically, the user apparatus 14 may be a mobile station. The base stations 12, 13 are connected with each other via an interface x2. In the illustration, the user apparatus 14 is conducting handover, and the left-hand base station 12 works as a source base station (handover source) whereas the right-hand base station 13 works as a target base station (handover target). The base stations 12, 13 constitute a radio access network (RAN). The access gateway (aGW) 11 may or may not constitute the radio access network (RAN) together. In any case, the access gateway (aGW) 11 is connected with a base station (eNB) and an apparatus on a core network (CN).

Communications between the access gateway (aGW) 11 and the base stations (eNBs) 12, 13 are conducted in a data unit referred to as "service data unit (SDU)" via the interfaces S1. For example, the service data unit may be an internet protocol (IP) packet or include a processing unit such as 1500 bytes or variable data sizes depending on applications. On the other hand, communications between the base stations 12, 13 and the user apparatus 14 are conducted in another data unit referred to as a packet data unit (PDU). The size of the packet data unit (PDU) may be variable depending on radio channel conditions.

Figure 2:
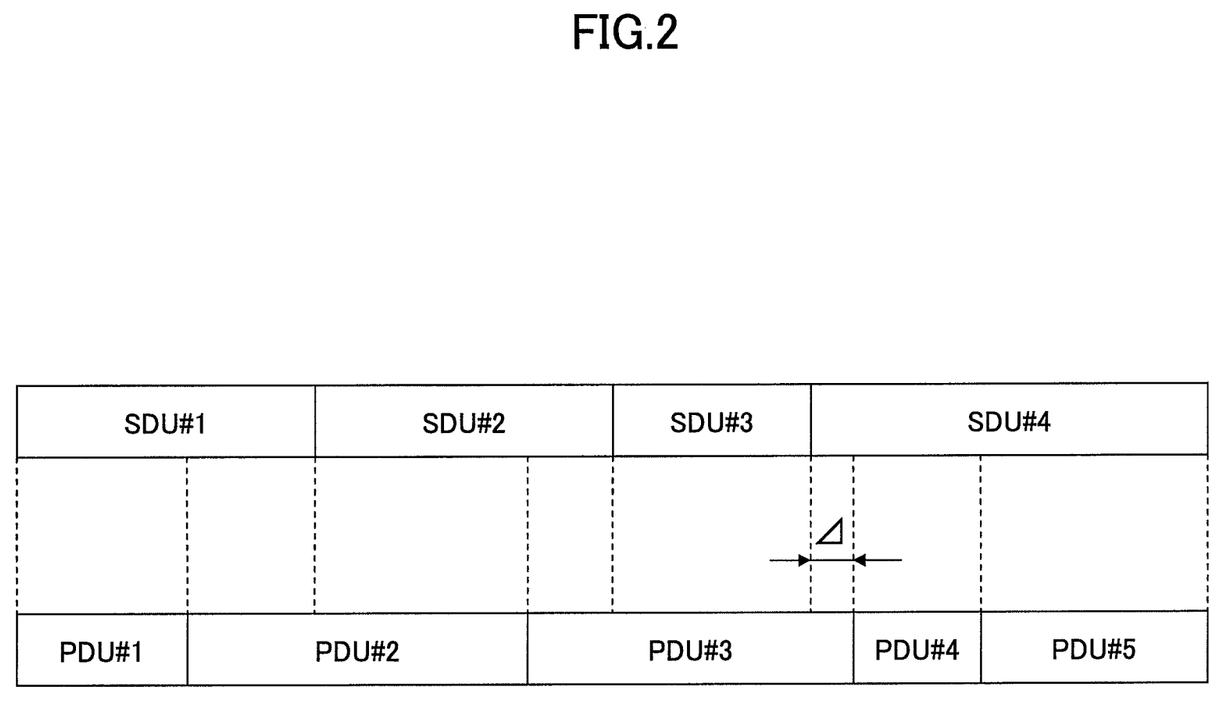
FIG. 2 shows an exemplary correspondence between service data units (SDUs) and packet data units (PDUs)

FIG. 2 schematically shows exemplary correspondence between service data units (SDUs) and packet data units (PDUs). In the illustration, the horizontal axis corresponds to time. For convenience, downlink data transmissions are explained herein. The data size of the service data units (SDUs) is variable depending on applications. In addition, the data size of the packet data units (PDUs) is also variable depending on radio channel conditions. In radio transmission with keeping a predefined quality, a greater data size may be applied under a better channel while a smaller data size may be applied under a worse channel condition.

In order to restore received signals without error, Hybrid Automatic Repeat request (HARQ), which is a combination of error correction coding and automatic retransmission control, may be utilized. More specifically, N-channel Stop-and-Wait scheme HARQ may be utilized.

Figure 3:
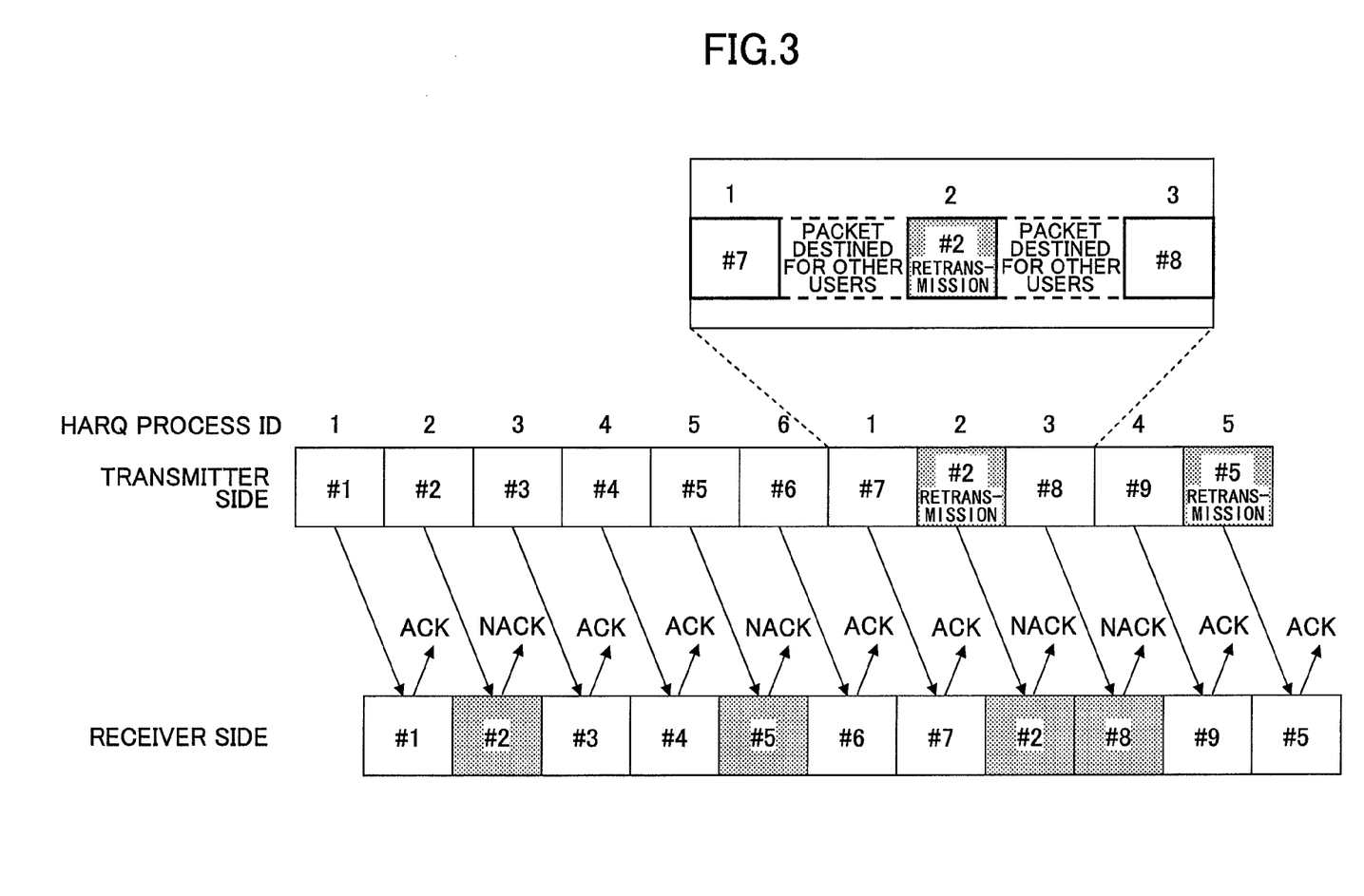
FIG. 3 shows an exemplary application of 6-channel Stop-and-Wait scheme.

FIG. 3 schematically shows an exemplary application of 6-channel Stop-and-Wait scheme. In the illustrated example, a portion of packet transmission to a certain user apparatus is illustrated. For convenience, downlink data transmission is explained herein. In this example, the transmitter side is a base station, and the receiver side is a user apparatus. On the other hand, this role assignment may be reversed in uplink data transmission. Numbers "1" to "6" are cyclically assigned as process IDs. As shown on the left side of the illustration, a packet data unit (PDU) with "#1" (which is simply indicated as "#1" in the illustration) is transmitted in a frame associated with process ID with "1". In the illustration, transmitted packet data units #1, #2, ... are illustrated with the same size, but actually transmitted packet data units (PDUs) may have various data sizes depending on channel conditions as stated above. When the receiver side successfully receives packet data unit #1, the receiver (user apparatus in this example) returns acknowledgement (ACK) signal to the base station. Upon receiving the ACK signal, the base station transmits packet data unit #7 (N+1=6+1=7) in the next process ID "1".

On the other hand, packet data unit #2 transmitted in process ID "2" has not been successfully received, and a nonacknowledgement (NACK) signal is returned to the base station. In response to receipt of the NACK signal, the base station retransmits packet data unit #2 in the next process ID "2" (which is illustrated in the transmitter side as "#2 Retransmission"). Upon receiving the retransmitted packet data unit #2, the user apparatus combines the firstly received PDU #2 with the presently retransmitted PDU #2 and performs error detection on it again. In the illustration, some error is detected again, and accordingly further retransmission is requested.

As stated above, the packet data unit is used as the retransmission unit in HARQ and is variable depending on channel conditions. As described in conjunction with FIG. 2, a single packet data unit (PDU) may fully or partially include one or more service data units (SDUs). For convenience, it is assumed herein that packet data units #1, #3 and #4 are successfully received while packet data units #2 and #5 are unsuccessfully received. Under this assumption, it would be concluded that only one service data unit (SDU #3) is successfully received. In other words, the other service data units (SDU #1, #2 and #4) could not be completed. Subsequently, once some of the incomplete service data units are successfully retransmitted, the service data units are completed and thus become available to desired applications.

It is assumed under the situation where packet data units #1, #3 and #4 have been successfully received but packet data units #2 and #5 have not been successfully received that handover between base stations is initiated as illustrated in FIG. 1. In this situation, the source base station 12 forwards service data units SDU #1, #2 and #4 stored in a transmission buffer to the target base station 13. This data transmission is carried out via the interface x2. Then, the source base station 12 discards packet data units PDU #2 and #5. The user apparatus UE obtains information on service data units SDU #1, #2 and #4 from the target base station 13 again. In other words, a new packet data unit is generated to transmit service data units SDU #1, #2 and #4 depending on channel conditions between the user apparatus UE and the target base station 13 and is transmitted to the user apparatus UE.

Although downlink data transmission has been explained above, in response to initiation of handover between the base stations during uplink data transmission, uplink data transmission is carried out as follows. Similar to the above situation, it is assumed that packet data units #1, #3 and #4 have been successfully received while packet data units #2 and #5 have not been successfully received. In this case, the source base station 12 can generate service data unit SDU #3 from successfully received packet data units PDU #1, #3 and #4. The base station 12 forwards completed service data unit SDU #3 to the access gateway (aGW) 11. Upon initiation of handover, the base station 12 discards all the incompletely received service data units SDU #1, #2 and #4. Thus, they will be transmitted from the user apparatus UE to the access gateway 11 via the target base station 13. Such data operations in handover are disclosed in non-patent document "3GPP TSG RAN TR25.813 v0.9.1".

DISCLOSURE OF INVENTION

Problem to be Solved by the Invention

If the above operations are conducted during the handover, large communication traffic between base stations may be used in downlink transmission, which may lead to some problems such as large load of the base stations or excessive utilization of network resources. These problems may be more serious as more user apparatuses are involved in handover. The source base station may discard packet data units associated with retransmissions, and the target base station may generate new packet data units again. This may not be preferable from the viewpoint of efficient utilization of radio resources. In addition, even in cases of successful reception of a portion of service data unit in uplinks, if the whole service data unit cannot be completed, the whole service data unit may be discarded. In other words, the successfully transmitted data portion must be retransmitted via the target base station, which may not be preferable from the viewpoint of efficient utilization of radio resources.

The present invention is intended to overcome one or more of the above problems. One object of the present invention is to make efficient utilization of communication resources during handover between base stations by a user apparatus in a communication system including an access gateway, a radio access network and the user apparatus.

Means for Solving the Problem

A base station for use in the present invention comprises a transmission buffer configured to store a service data unit received from the access gateway; a retransmission buffer configured to store a packet data unit to be retransmitted in a radio downlink; a scheduler configured to determine assignment of radio resources to user apparatuses and supply scheduling information; and a transmitted signal processing unit configured to generate a transmitted signal including data stored in the transmission buffer or the retransmission buffer in accordance with the scheduling information. The scheduler is configured to determine the scheduling information to transmit data destined for a user apparatus requesting handover in priority to data destined for a user apparatus that does not request handover.

Advantage of the Invention

According to the embodiments of the present invention, it is possible to make efficient utilization of communication resources during handover between base stations by a user apparatus in a communication system including an access gateway, a radio access network and the user apparatus.

LIST OF REFERENCE SYMBOLS

11: access gateway
12, 13: base station
14: user apparatus
402: reception amplifier unit
404: CQI processing unit
406: metric processing unit
408: measurement report processing unit
410: scheduler
412: transmission buffer
414: transmitted signal processing unit
416: HARQ buffer
418: transmission amplifier
502: amplifier
504: CQI processing unit
506: adjacent cell measurement unit
508: handover event determination unit
510: measurement report generation unit
512: transmission buffer
514: HARQ buffer
516: control channel generation unit
518: transmitted signal processing unit
520: transmission amplifier

BEST MODE FOR CARRYING OUT THE INVENTION

In one embodiment of the present invention, a scheduler in a base station determines scheduling information to transmit data (firstly transmitted data or retransmitted data) destined for user apparatuses requesting handover in priority to data destined for user apparatuses that do not request handover. This scheme may be preferable from the viewpoint of reduction in data discarded in handover due to no acknowledgement and/or data transferred between base stations.

The scheduling information may be determined to transmit data indicative of service data units (SDUs) destined for user apparatuses requesting handover in priority to data indicative of service data units (SDUs) destined for user apparatuses that do not request handover. This scheme may be preferable from the viewpoint of reduction in data buffered in a transmission buffer for the user apparatuses and data transferred between base stations.

The scheduling information may be determined to transmit data indicative of packet data units (PDUs) destined for user apparatuses requesting handover in priority to data indicative of packet data units (PDUs) destined for user apparatuses that do not request handover. This scheme may be preferable from the viewpoint of reduction in data buffered in a HARQ buffer for the user apparatuses and the PDUs discarded unnecessarily.

The packet data units may be included in transmitted signals in accordance with respective data sizes and data boundary positions of the service data units (SDUs) and the packet data units (PDUs). Further segmentation may be prevented for the service data units (SDUs) destined for user apparatuses requesting handover. This scheme may be preferable from the viewpoint of facilitated completion of the SDUs in the user apparatuses and reduction in the PDUs discarded in source base stations due to no receipt of acknowledgement.

Among packet data units required to complete uncompleted service data units in a user apparatus, packet data units that can contribute to completion of more service data units may be transmitted in priority. This scheme may be also preferable from the viewpoint of facilitated completion of the SDUs in the user apparatus and reduction in the PDU discarded in a source base station due to no receipt of acknowledgement.

In one embodiment of the present invention, a user apparatus requesting handover asks a base station to provide the user apparatus with data transmission opportunities in priority to user apparatuses that do not request handover. The base station may determine scheduling information to transmit data indicative of packet data units (PDUs) destined for the user apparatus requesting handover in priority to data indicative of the packet data units (PDUs) destined for the user apparatuses that do not request handover.

The packet data units to be included in transmitted signals may be determined in accordance with respective data sizes and data boundary positions of the service data unit (SDU) and the packet data unit (PDU).

Among the packet data units required to complete uncompleted service data units in a base station, packet data units contributing to completion of more service data units may be transmitted in priority.

If a user apparatus requests handover, further segmentation may be prevented in the user apparatus.

First Embodiment

Figure 4:
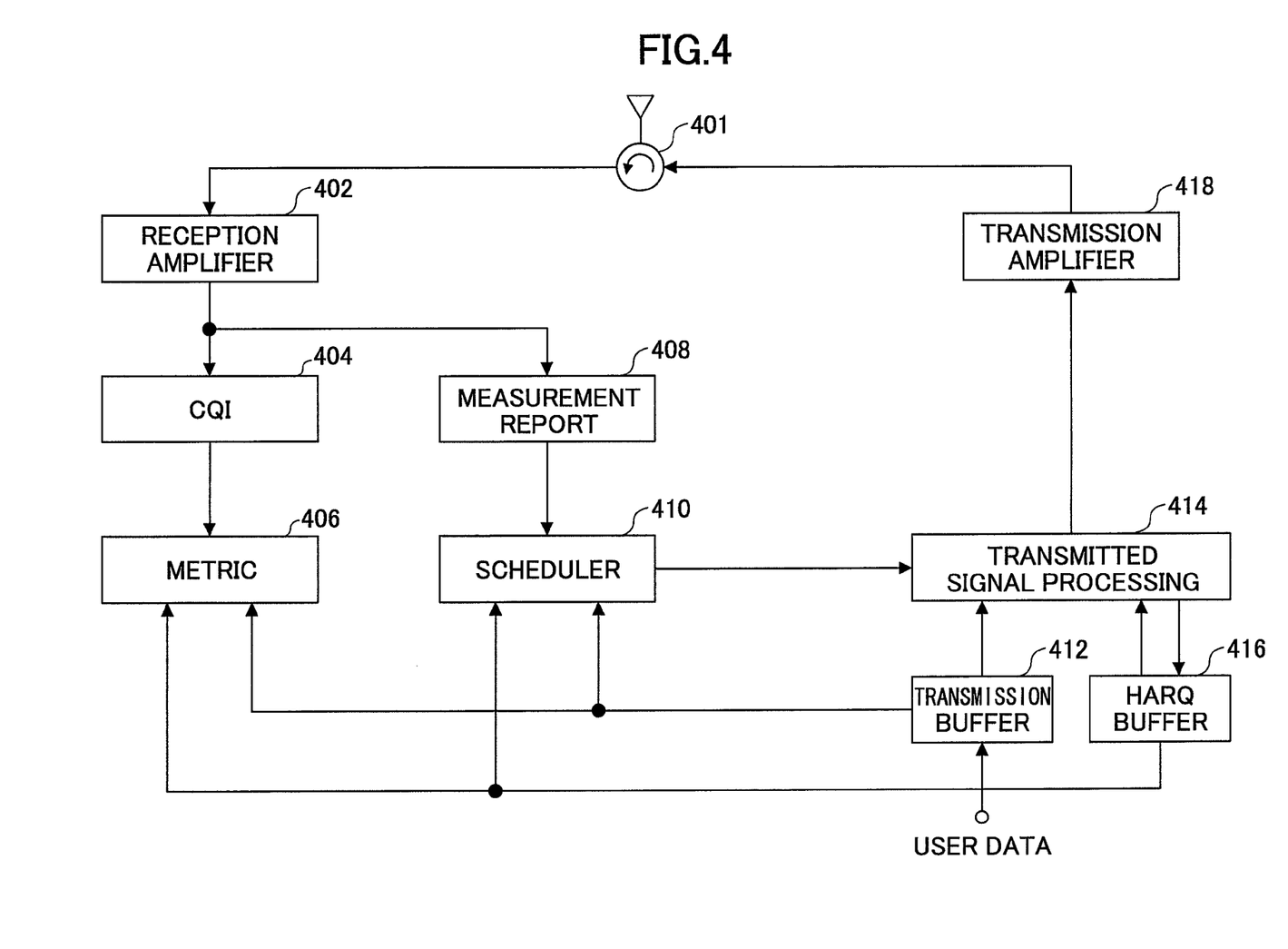
FIG. 4 is a functional block diagram illustrating a base station according to one embodiment of the present invention.

FIG. 4 is a functional block diagram illustrating a base station according to one embodiment of the present invention. In FIG. 4, a reception amplifier unit 402, a CQI processing unit 404, a metric processing unit 406, a measurement report processing unit 408, a scheduler 410, a transmission buffer 412, a transmitted signal processing unit 414, a HARQ buffer 416 and a transmission amplifier 418 are illustrated.

The reception amplifier unit 402 synchronizes and receives uplink signals from a mobile station.

The CQI processing unit 404 extracts CQI information from the received signals. In this embodiment, the CQI is a value obtained by encoding a SIR measurement value received at a user apparatus, for example, at 32 levels. The CQI may be represented in various manners as well-known in the technical field. Instantaneous CQIs reported from a user apparatus may be averaged.

The metric processing unit 406 computes a metric for scheduling based on one or more of various parameters such as CQI information, the amount of data in a transmission buffer and retransmission information (information on retransmission such as the number of retransmissions or the data size of retransmitted packets). The metric may be variable depending on the quality of channel condition or some parameters indicative of fairness or others.

The measurement report processing unit 408 extracts information indicative of a measurement report from the received signals. Based on the measurement report, it can be determined whether the user apparatus is to conduct handover.

Based on the metric from the metric processing unit 406, the received measurement report, the amount of data in the transmission buffer, the retransmission information and/or others, the scheduler 410 determines which radio resource is assigned for which user apparatus and supplies scheduling information indicative of the determined assignment. The amount of data in the transmission buffer and the retransmission information may be taken into account by only the metric processing unit 406. As stated below, the scheduler 410 determines the scheduling information to transmit data destined for user apparatuses requesting handover in priority to data destined for user apparatuses that do not request handover.

The transmission buffer 412 buffers downlink user data, that is, service data units (SDUs), until transmission thereof. For example, the service data unit (SDU) may be IP (Internet Protocol) packets or have a processing unit such as 1500 bytes or various data sizes depending on applications.

The transmitted signal processing unit 414 generates transmitted signals based on the scheduling information. The transmitted signal may be processed in a data unit referred to as a packet data unit (PDU). The size and transmission scheme of the packet data unit (PDU) are controlled adaptively depending on the scheduling information to satisfy predefined quality depending on radio channel conditions. The transmission scheme may be specified with data modulation scheme, channel coding rate, frequency resource blocks and/or others.

The transmitted signal processing unit 414 manages correspondence between the service data units (SDUs) and the packet data units (PDUs) for radio transmission. The transmitted signal processing unit 414 generates radio packets by segmenting the service data units (SDUs) accumulated in the transmission buffer 412 in conformity of the size of the packet data unit (PDU) (segmentation). In this case, one radio packet is generated by concatenating different service data units (SDUs) as needed (concatenation). In the exemplary illustration in FIG. 2, service data unit SDU #1 is segmented into two portions, and the first portion of the service data unit SDU #1 is used to generate packet data unit PDU #1. On the other hand, packet data unit PDU #2 is generated by concatenating the second portion of SDU #1 with the first portion of SDU #2.

The HARQ buffer 416 stores information for controlling retransmission. Specifically, information items for subsequent retransmission such as firstly transmitted packet data units (PDUs), process numbers, the number of retransmissions and contents of response signals (ACK, NACK) are stored.

The transmission amplifier 418 converts signals to be transmitted into RF signals and transmits them.

For simplicity of illustration, control channels and other channels are not explicitly illustrated but are practically multiplexed properly to generate transmitted signals.

Figure 5:
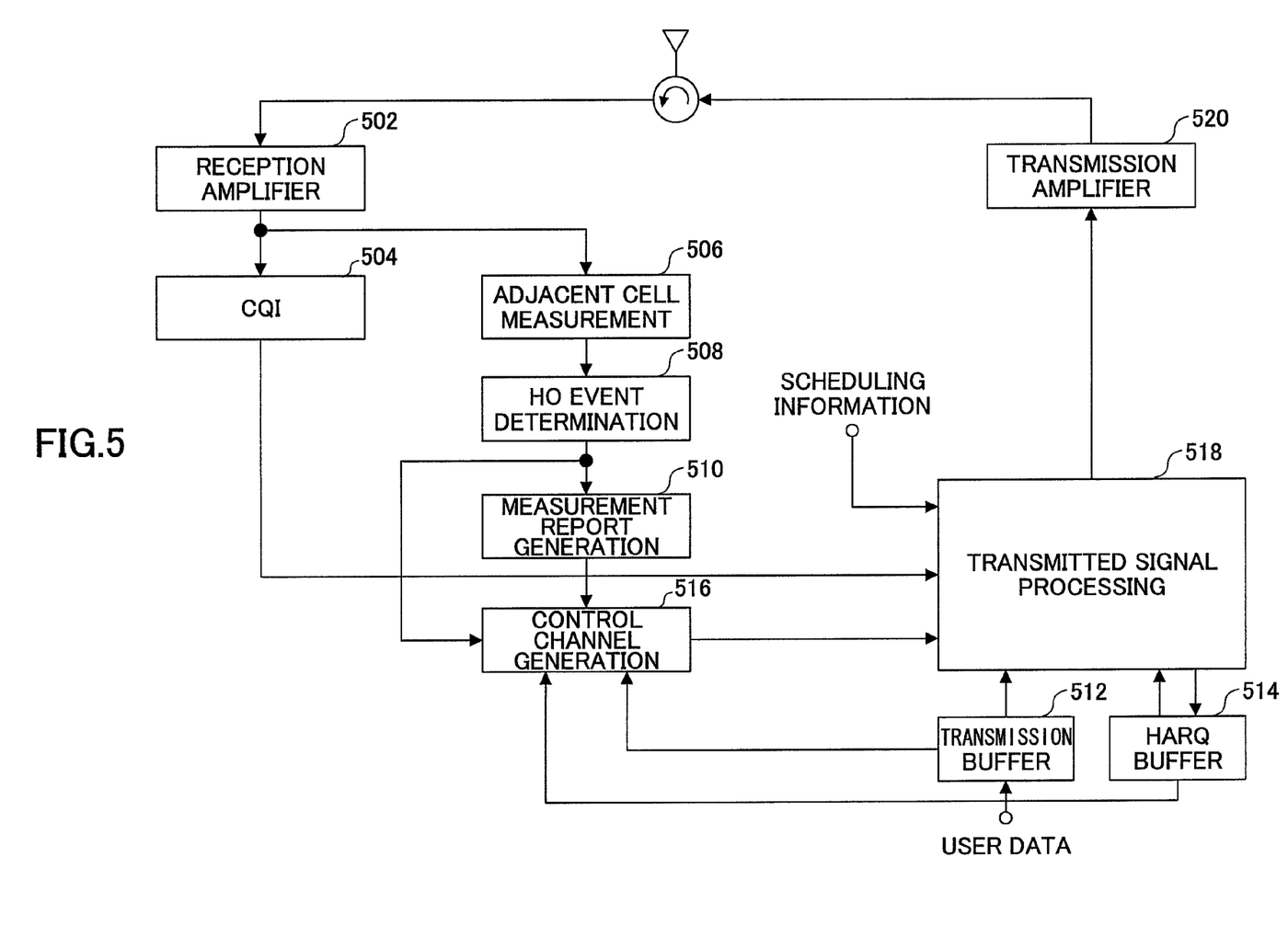
FIG. 5 is a functional block diagram illustrating a user apparatus according to one embodiment of the present invention.

FIG. 5 is a functional block diagram illustrating a user apparatus according to one embodiment of the present invention. Typically, the user apparatus may be a mobile station such as a mobile phone. In FIG. 5, a reception amplifier 502, a CQI processing unit 504, an adjacent cell measurement unit 506, a handover event determination unit 508, a measurement report generation unit 510, a transmission buffer 512, a HARQ buffer 514, a control channel generation unit 516, a transmitted signal processing unit 518 and a transmission amplifier 520 are illustrated.

The reception amplifier 502 synchronizes system and frequency as desired for reception and receives signals.

The CQI processing unit 504 measures radio channel condition CQIs (instantaneous CQIs) from signals (for example, common pilot channels) received for a presently communicating cell. The CQI can be represented in various quantities such as $E_S/I_0$ (Symbol energy to interference power ratio). More specifically, the CQI processing unit 504 receives a downlink common pilot channel from a base station, measures a reception SIR, and encodes the measured reception SIR at 32 levels to represent the CQI. The CQI may be measured every predefined measurement period except for during a gap. The measured CQI may be reported to the base station. The instantaneous CQI values may be averaged to an extent to follow distance variation and shadowing.

The adjacent cell measurement unit 506 measures reception quality of signals from adjacent cells other than the connecting cell.

The handover (HO) event determination unit 508 determines based on measurements of the adjacent cell measurement unit 506 whether an event has been detected for prompting handover by the user apparatus. Generally, if the reception quality of signals from adjacent cells is equal to or higher than the reception quality of signals from the presently connecting cell, a handover event may occur.

The measurement report generation unit 510 generates a measurement report indicating that the user apparatus should initiate handover based on the detected handover event.

The transmission buffer 512 buffers uplink user data, that is, uplink service data units (SDUs) until transmission thereof. For example, the service data unit (SDU) may be IP (Internet Protocol) packets, have a processing unit such as 1500 bytes or be configured to have various data sizes depending on applications.

The HARQ buffer 514 stores information for controlling retransmission. Specifically, information items for subsequent retransmission such as a firstly transmitted packet data unit (PDU), process number, the number of retransmissions and response signals (ACK, NACK) may be stored.

The control channel generation unit 516 generates (uplink) control channels. The control channel may include a request for assigning radio channels for uplink transmission and/or a measurement report.

The transmitted signal processing unit 518 multiplexes CQI information, control channels, data channels and/or others based on scheduling information received from a base station to generate signals to be transmitted. The signals are transmitted in a data unit referred to as packet data unit (PDU). The size and transmission scheme of the packet data unit (PDU) are adaptively controlled in accordance with the scheduling information so that a predefined quality can be satisfied depending on radio channel conditions.

The transmitted signal processing unit 518 manages correspondence between the service data units (SDUs) and the packet data units (PDUs) for radio transmission. The transmitted signal processing unit 414 segments the service data unit (SDU) accumulated in the transmission buffer 412 in conformity of the size of the packet data unit (PDU) (segmentation) and generates a radio packet. In this case, different service data units (SDUs) are concatenated as needed (concatenation), and one radio packet is generated.

The transmission amplifier 520 converts a signal to be transmitted into a RF signal and transmits it.

Figure 6:
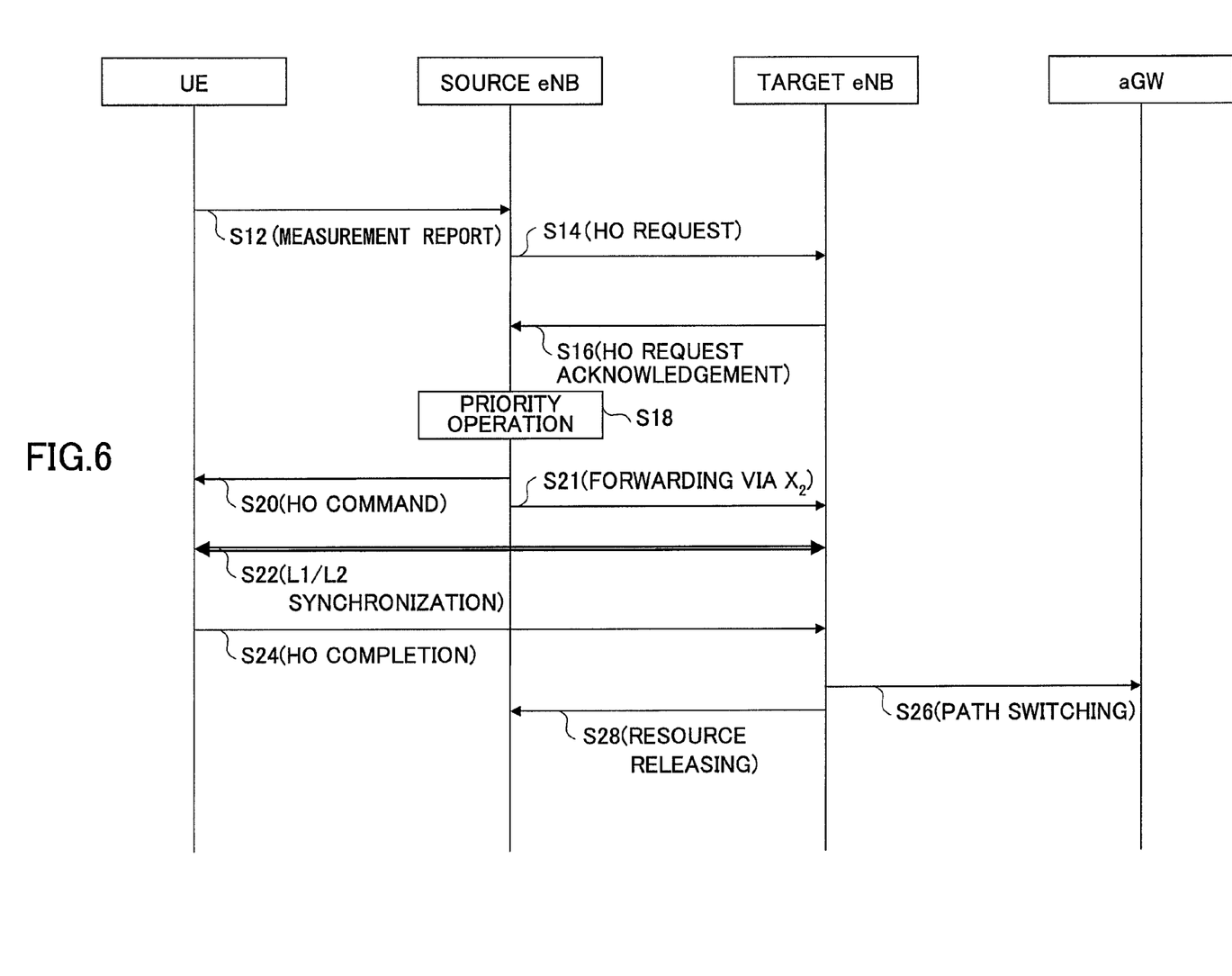
FIG. 6 is a flowchart illustrating an operation according to one embodiment of the present invention.

FIG. 6 shows an operation according to one embodiment of the present invention. Specifically, an exemplary handover operation is illustrated in downlink transmission. At step S12, a user apparatus UE detects a handover event and transmits a measurement report to a source base station. The source base station is a base station presently connected with the user apparatus.

At step S14, in response to receipt of the measurement report from the user apparatus, the source base station informs a target base station that a handover request has been issued. At step S16, the target base station informs the source base station that radio resources have been reserved in response to the handover request. If appropriate radio resources have not been reserved, the handover to the target base station cannot be conducted.

At step S18, "priority operation" is conducted in the source base station. At step S18, the source base station performs one or more of operation items as presented below.

(A) The source base station conducts scheduling such that data destined for the user apparatus attempting handover (the service data units (SDUs) stored in the transmission buffer) can be transmitted in priority to data destined for other user apparatuses. It can be determined with reference to the measurement report which user apparatus is to initiate handover (408 in FIG. 4). When the data destined for this user apparatus is transmitted in priority, a lesser amount of data is buffered in the transmission buffer 412 for the user apparatus. As a result, a lesser amount of service data unit will be forwarded to the target base station via the interface x2 at subsequent step S21. According to this scheme, a lesser amount of communication resources between the base stations has to be used in handover.

(B) The source base station conducts scheduling such that data retransmitted to the user apparatus attempting handover (the packet data units (PDUs) stored in the HARQ buffer) can be transmitted in priority to other data. As illustrated in the enlarged view of "#2 Retransmission" in FIG. 3, packets destined for other user apparatuses are generally transmitted between successive process IDs for a certain user apparatus in practical data transmission. In this scheme, data transmission is scheduled such that the data transmission specified by "#2 Retransmission" can have as early as a start timing as possible. Information associated with the retransmission is transmitted from the HARQ buffer 416 to the metric processing unit 406 and/or the scheduler 410. When the data is retransmitted in priority, the probability will be higher that acknowledgement signals may be returned from the user apparatus to the base station. Since the packet data units (PDUs) remaining in the HARQ buffer 416 are discarded in handover, this scheme makes it possible to reduce the packet data units due to no receipt of the acknowledgements.

(C) The source base station conducts scheduling such that the packet data units (PDUs) contributing to completion of more service data units (SDUs) can be transmitted in priority to the packet data units (PDUs) required to complete incomplete service data units (SDUs) in the user apparatus. For example, it is assumed that the relationship between the service data units (SDUs) and the packet data units (PDUs) destined for a certain user apparatus is defined as illustrated in FIG. 2. Further, it is assumed that acknowledgements have been obtained for packet data units #1 and #3 while no acknowledgement has been obtained for the other PDUs. In this case, the completed service data unit is only SDU #3. In order to complete uncompleted service data units, PDU #2, #4 and #5 are required. If PDU #2 is successfully transmitted, service data units SDU #1 and #2 could be completed. In order to complete the service data unit SDU #4, the packet data units PDU #4 and #5 must be successfully transmitted. In this scheme, PDU #2 contributing to completion of SDU #1 and #2 will be transmitted in priority to PDU #4 and #5. Thereby, completion of the service data units can be promoted, and the service data units to forward to the target base station via the interface x2 at subsequent step S21 can be reduced. Thus, this scheme uses a lesser amount of communication resources between the base stations in handover.

(D) The source base station determines the packet data units (PDUs) to be included in transmitted signals in accordance with the respective data sizes and data boundary positions of the service data units (SDUs) and the packet data units (PDUs). Specifically, a source base station uses as low information bit rate of the packet data units as possible while preventing further segmentation of the service data units destined for a user apparatus attempting handover. In the illustration in FIG. 2, for example, it is assumed that PDU #1 and #2 have been transmitted at start time of priority operation while PDU #3 has not been transmitted. In schemes other than this scheme, information in PDU #3 comprises a portion of SDU #2, the entire portion of SDU #3 and a portion of SDU #4. If a transmission scheme specified in scheduling information is used, the information can be transmitted while satisfying predefined quality. In this scheme, segmentation is prevented after initiation of the priority operation, and segmentation is also prevented to extract a portion of SDU #4. Thus, information in PDU #3 includes only a portion of SDU #2 and the entire portion of SDU #3. Extra resources indicated by "Δ" in FIG. 2 are used to transmit SDU #2 and #3. For example, MCS level may be accordingly reduced. Also, the channel coding rate or multilevel may be reduced. As a result, a portion of SDU #2 and the entire portion of SDU #3 can be successfully transmitted with higher probability. Even if a portion of SDU #4 is included in PDU #3 and PDU #4 and #5 are subsequently generated, there is a high probability that PDU #4 and #5 may be discarded without receipt of acknowledgement. Alternatively, PDU #3 may be also discarded. Under this assumed situation, the acknowledgement cannot be easily obtained for PDU #4 and #5 (also for PDU #3 in some cases) within a short time period before a handover command is issued. It may be preferable to prevent new segmentation to reliably transmit already segmented SDUs from the viewpoint of reduction in PDU discarded without reception of the acknowledgement.

In addition to prevention of the segmentation of the service data units (SDUs) destined for the user apparatus requesting handover, segmentation may be prevented for the packet data units (PDUs) destined for the user apparatus. Even in a case where the segmentation is permitted and a portion of the packet data units has been transmitted to the user apparatus prior to the handover, if the other portion is not received, they may be wasted. Thus, the segmentation of the packet data units destined for the user apparatus conducting handover does not have to be strongly permitted.

Note that in addition to the transmission of retransmitted data and data destined for user apparatuses attempting handover in priority to other data, it may be determined whether the handover belongs to the same base station. For example, a user apparatus conducting handover to another base station may be granted higher priority than that conducting handover within the same base station. In the handover without modification of the base station (intra-eNB handover or inter-sector handover), MAC protocol layer for managing HARQ or RLC protocol layer for handling retransmission depending on residual errors in HARQ may not be reset. Thus, HARQ processes may be inherited even after completion of the handover or PDUs may be inherited at RLC level. On the other hand, in the handover with modification of base stations (inter-eNB handover or inter-cell handover), MAC and RLC may be reset, and thus it may be practically difficult to inherit the HARQ processes or the PDU at the RLC level. As a result, it is particularly desirable to grant scheduling for such a user apparatus high priority.

At step S20, the source base station issues a handover command to the user apparatus so that the user apparatus can actually conduct the handover. After the handover command is issued, at step S21, the source base station forwards the service data units without receipt of the acknowledgement to the target base station via the interface x2. Although the forwarding at step S21 is illustrated at this time point for clarity, it may be conducted at any other appropriate time point after the HO command has been issued. Note that at least the head part of forwarded data must arrive at the target base station prior to initiation of data transmission from the target base station.

At step S22, in response to the HO command, the user apparatus operates to synchronize with the source base station. Thereby, radio resources reserved for the user apparatus become available.

At step S24, after synchronization with the target base station, the user apparatus informs the target base station that the handover has been completed.

At step S26, the target base station requests the access gateway, which is an upper node thereof, to switch a downlink transfer path. Subsequently, the access gateway transmits downlink packets destined for the user apparatus to the target base station.

At step S28, in response to receipt of the handover completion report from the user apparatus, the target base station informs the source base station that the source base station may release radio resources destined for the user apparatus. Note that the path switching (step S26) and the resource releasing (step S28) may be reversed or performed at the same time.

In this manner, a series of operations associated with the handover have been completed.

Note that the priority operation (step S18) is not limited to after receipt of the HO request acknowledgement and may be conducted at any other appropriate time point before the HO command is issued (step S20). In other words, the priority operation may be conducted at any time point after receipt of the measurement report and before issuance of the HO command. Note that it is preferable that even in the case of rejection of handover to the target base station, the priority operation be initiated after receipt of the HO request acknowledgement in order not to make the operation unnecessary.

Second Embodiment

The first embodiment has been focused on downlinks. The second embodiment of the present invention is focused on uplinks.

Figure 7:
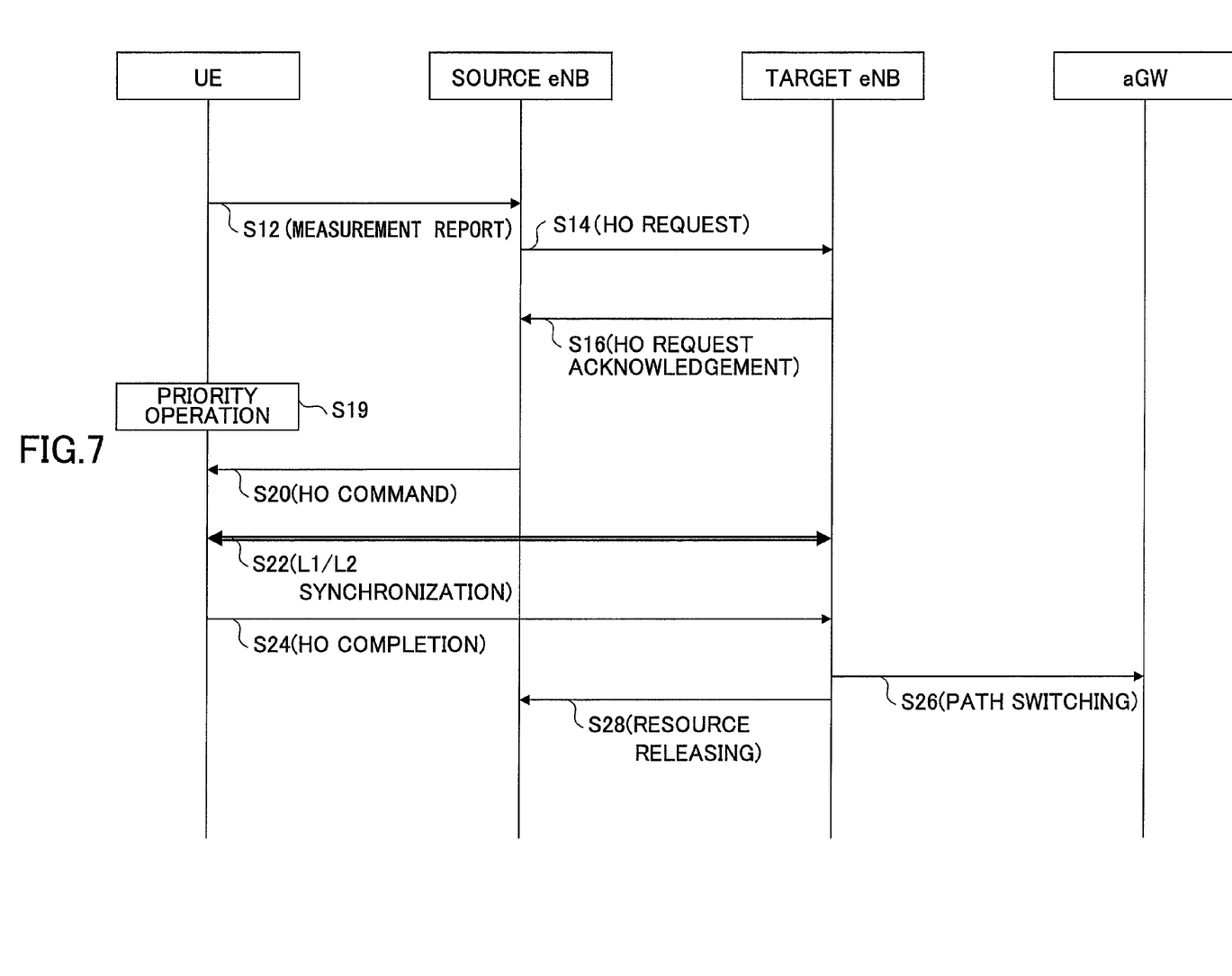
FIG. 7 is a flowchart illustrating another operation according to one embodiment of the present invention.

FIG. 7 shows an exemplary operation according to this embodiment. An almost similar operation to the described operation in FIG. 6 is performed. In this embodiment, a user apparatus conducting uplink data transmission transmits a measurement report to a source base station at step S12, and then the priority operation is performed until it responds to a handover command at step S20.

In the priority operation at step S19, the user apparatus performs one or more of operations as presented below.

(A) The user apparatus requests a base station to transmit the service data units (SDUs) waiting in a transmission buffer due to initiation of handover in priority to data destined for other user apparatuses.

Specifically, the user apparatus requests the base station via control channels to grant resource assignment for the user apparatus at a higher priority. As stated above, in uplinks, the base station discards incomplete service data units in handover. If more transmission opportunities are provided, there is a higher probability of completion of the service data units (SDUs) in the source base station, resulting in reduction in the service data units being discarded in the handover.

(B) The user apparatus transmits retransmitted data, that is, data stored in the HARQ buffer, in priority to untransmitted data, that is, data stored in the transmission buffer. If the retransmitted data is transmitted in priority, the base station would have a higher probability of completion of the SDUs. As a result, it is possible to reduce the service data units (SDUs) discarded in handover.

(C) The user apparatus transmits the packet data units (PDUs) contributing to completion of a larger number of the service data units among the packet data units (PDUs) required to complete incomplete service data units (SDUs) in the base station in priority to the other packet data units. Thereby, the source base station can efficiently complete the service data units (SDUs) and reduce the number of the service data units discarded in handover.

(D) The user apparatus determines the packet data units (PDUs) to be included in transmitted signals in accordance with the respective data sizes and data boundary positions of the service data units (SDUs) and the packet data units (PDUs). Specifically, the user apparatus sets as low information bit rate of the packet data units as possible while preventing further segmentation. In this scheme, the segmentation is prevented after initiation of the priority operation, and thus excess resources can be used to transmit already extracted packet data units, which may improve probability of successful transmission. In this manner, it is possible to reduce the amount of service data units (SDUs) discarded in handover.

For convenience, the present invention has been described through divided several embodiments, but the division of the embodiments is not essential to the present invention. Either the first embodiment or the second embodiment may be used independently, and both of them may be used together. In particularly, if both the embodiments are used, a lesser amount of SDUs are discarded in both uplinks and downlinks, resulting in reduction in network resources used between base stations.

The present invention has been described with reference to the specific embodiments of the present invention, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviation from the spirit of the present invention.

This international patent application is based on Japanese Priority Application No. 2006-167998 filed on Jun. 16, 2006, the entire contents of which are hereby incorporated by reference.

The invention claimed is:

1. A base station for use in a communication system including an access gateway, a radio access network and a user apparatus, the base station constituting the radio access network, the base station comprising:
   a transmission buffer configured to store a service data unit received from the access gateway;
   a retransmission buffer configured to store a packet data unit to be retransmitted in a radio downlink;
   a scheduler configured to determine assignment of radio resources to user apparatuses and supply scheduling information; and
   a transmitted signal processing unit configured to generate a transmitted signal including data stored in the transmission buffer or the retransmission buffer in accordance with the scheduling information,
   wherein the scheduler is configured to determine the scheduling information to transmit data destined for a user apparatus requesting handover in priority to data destined for a user apparatus that does not request handover,
   wherein the scheduling information is determined to transmit a packet data unit contributing to completion of a larger number of service data units among one or more packet data units required in a scheduled user apparatus to complete an incomplete service data unit in priority to the other packet data units destined for the scheduled user apparatus,
   wherein the packet data unit to be included in the transmitted signal is determined in accordance with respective data sizes of the service data unit and the packet data unit and data boundary position between the service data unit and the packet data unit, and
   wherein segmentation is prevented for a service data unit destined for the user apparatus requesting handover, the segmentation being for segmenting a service data unit and inserting the segmented service data unit in multiple packet data units.

2. The base station as claimed in claim 1, wherein the scheduling information is determined to transmit data stored in the transmission buffer and destined for the user apparatus requesting handover in priority to data stored in the transmission buffer and destined for the user apparatus that does not request handover.

3. The base station as claimed in claim 1, wherein the scheduling information is determined to transmit data stored in the retransmission buffer and destined for the user apparatus requesting handover in priority to data stored in the retransmission buffer and destined for the user apparatus that does not request handover.

4. The base station as claimed in claim 1, wherein segmentation is prevented for a packet data unit destined for the user apparatus requesting handover.

5. The base station as claimed in claim 1, wherein the scheduler is configured to determine the scheduling information to transmit data destined for a user apparatus requesting handover toward a base station different from a base station for a residing cell in priority to data destined for other user apparatuses.

6. A method for use in a communication system including an access gateway, a radio access network and a user apparatus, the method being used in a base station constituting the radio access network, the base station including a transmission buffer configured to store a service data unit received from the access gateway and a retransmission buffer configured to store a packet data unit to be retransmitted in a radio downlink, the method comprising the steps of:
   determining assignment of radio resources for user apparatuses and supplying scheduling information from a scheduler; and
   generating a transmitted signal including data stored in the transmission buffer or the retransmission buffer in accordance with the scheduling information,
   wherein the scheduling information is determined to transmit data destined for a user apparatus requesting handover in priority to data destined for a user apparatus that does not request handover,
   wherein the scheduling information is determined to transmit a packet data unit contributing to completion of a larger number of service data units among one or more packet data units required in a scheduled user apparatus to complete an incomplete service data unit in priority to the other packet data units destined for the scheduled user apparatus, wherein the packet data unit to be included in the transmitted signal is determined in accordance with respective data sizes of the service data unit and the packet data unit and data boundary position between the service data unit and the packet data unit, and wherein segmentation is prevented for a service data unit destined for the user apparatus requesting handover, the segmentation being for segmenting a service data unit and inserting the segmented service data unit in multiple packet data units.

7. A user apparatus for use in a communication system including an access gateway, a radio access network and the user apparatus, the user apparatus wirelessly communicating with a base station constituting the radio access network, the user apparatus comprising:

a transmission buffer configured to store a service data unit to be transmitted in an uplink;

a retransmission buffer configured to store a packet data unit to be retransmitted in a radio uplink; and a transmitted signal processing unit configured to generate a transmitted signal including data stored in the transmission buffer or the retransmission buffer in accordance with scheduling information received from the base station, wherein the scheduling information is determined in the base station to transmit data destined for a user apparatus requesting handover in priority to data destined for a user apparatus than does not request handover, wherein the scheduling information is determined to transmit a packet data unit contributing to completion of a larger number of service data units among one or more packet data units required in the base station to complete an incomplete service data unit in priority to the other packet data units destined for the base station, wherein the packet data unit to be included in the transmitted signal is determined in accordance with respective data sizes of the service data unit and the packet data unit and data boundary position between the service data unit and the packet data unit, and wherein segmentation is prevented for a service data unit destined for the user apparatus requesting handover, the segmentation being for segmenting a service data unit and inserting the segmented service data unit in multiple packet data units.

8. The user apparatus as claimed in claim 7, wherein the scheduling information is determined to transmit data stored in the retransmission buffer and destined for the user apparatus requesting handover in priority to data stored in the retransmission buffer and destined for a user apparatus that does not request handover.

9. The user apparatus as claimed in claim 7, wherein the scheduling information is determined in the base station to transmit data destined for a user apparatus requesting handover toward a base station different from a base station for a residing cell in priority to data destined for other user apparatuses.

10. A method for use in a communication system including an access gateway, a radio access network and a user apparatus, the method being used for the user apparatus wirelessly communicating with a base station constituting the radio access network, the user apparatus including a transmission buffer configured to store a service data unit to be transmitted in an uplink and a retransmission buffer configured to store a packet data unit to be retransmitted in a radio uplink, the method comprising the steps of:

receiving scheduling information from the base station;

generating a transmitted signal including data stored in the transmission buffer or the retransmission buffer in accordance with the scheduling information; and transmitting the generated signal, wherein the scheduling information is determined in the base station to transmit data destined for a user apparatus requesting handover in priority to data destined for a user apparatus that does not request handover, wherein the scheduling information is determined to transmit a packet data unit contributing to completion of a larger number of service data units among one or more packet data units required in the base station to complete an incomplete service data unit in priority to the other packet data units destined for the base station, wherein the packet data unit to be included in the transmitted signal is determined in accordance with respective data sizes of the service data unit and the packet data unit and data boundary position between the service data unit and the packet data unit, and wherein segmentation is prevented for a service data unit destined for the user apparatus requesting handover, the segmentation being for segmenting a service data unit and inserting the segmented service data unit in multiple packet data units.

\* \* \* \* \*